United States Patent
Koh et al.

(10) Patent No.: US 10,552,110 B2
(45) Date of Patent: Feb. 4, 2020

(54) SYSTEM AND METHOD OF VIDEO MULTIPLEXING

(71) Applicant: Dell Products L.P., Round Rock, TX (US)

(72) Inventors: Boon Heng Koh, Singapore (SG); Dengzhai Xiong, Singapore (SG)

(73) Assignee: Dell Products L.P., Round Rock, TX (US)

(*) Notice: Subject to any disclaimer, the term of this patent is extended or adjusted under 35 U.S.C. 154(b) by 57 days.

(21) Appl. No.: 15/889,978

(22) Filed: Feb. 6, 2018

(65) Prior Publication Data

US 2019/0243600 A1   Aug. 8, 2019

(51) Int. Cl.
  *G06F 3/14*  (2006.01)
  *H04N 21/236*  (2011.01)

(52) U.S. Cl.
  CPC ......... *G06F 3/1454* (2013.01); *H04N 21/236* (2013.01)

(58) Field of Classification Search
  CPC ..... G06F 3/1454; G06F 3/147; H04N 21/236; H04N 21/4122; H04N 7/142; H04N 21/2187; G08B 13/19656; H04W 4/18; G06Q 20/10
  See application file for complete search history.

(56) References Cited

U.S. PATENT DOCUMENTS

| | | | | |
|---|---|---|---|---|
| 9,516,356 B2* | 12/2016 | Hamzeh | ............... | H04W 4/18 |
| 2005/0091311 A1* | 4/2005 | Lund | ............... | G08B 13/19656 709/203 |
| 2010/0169410 A1* | 7/2010 | Lund | ............... | G08B 13/19656 709/203 |
| 2011/0103472 A1* | 5/2011 | Lefebvre | ............ | H04N 21/4122 375/240.12 |
| 2011/0302442 A1* | 12/2011 | Garrett | ................... | G06Q 20/10 713/400 |
| 2012/0200658 A1* | 8/2012 | Duckworth | ............ | G06F 3/147 348/14.07 |
| 2013/0159401 A1* | 6/2013 | Sukeno | ............... | H04N 21/4122 709/203 |
| 2014/0053214 A1* | 2/2014 | Walker | ............... | H04N 21/2187 725/62 |
| 2016/0173823 A1* | 6/2016 | Duckworth | ............ | H04N 7/142 348/14.07 |

* cited by examiner

*Primary Examiner* — Richard J Hong
(74) *Attorney, Agent, or Firm* — Baker Botts L.L.P.

(57) ABSTRACT

In one or more embodiments, a display may receive a command that includes configuration information associated with a video stream, receive a video frame and may determine if the video frame is a synchronization frame. If the video frame is the synchronization frame, the display may reset one or more counters and may provide the video frame to another display or a repeater. If the video frame is not the synchronization frame, the display may determine if the video frame is to be displayed. If the video frame is to be displayed, the display may display the video frame and may provide the video frame to the other display or the repeater. If the video frame is not to be displayed, the display may provide the video frame to the other display or the repeater.

14 Claims, 5 Drawing Sheets

SYSTEM AND METHOD OF VIDEO MULTIPLEXING

BACKGROUND

Field of the Disclosure

This disclosure relates generally to information handling systems and more particularly to displaying information via multiple displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may provide a command, that include configuration information associated with a video stream, to each of multiple displays and may provide multiple video frames to a first display of the multiple displays. For example, the first display may be configured to receive the command, receive a video frame of the multiple video frames, and determine if the video frame is a synchronization frame. If the video frame is the synchronization frame, the first display may reset one or more counters and provide the video frame to a second display of multiple displays or a repeater. If the video frame is not the synchronization frame, the first display may determine if the video frame is to be displayed. If the video frame is to be displayed, the first display may display the video frame and provide the video frame to the second display or the repeater. If the video frame is not to be displayed, the first display may provide the video frame to the second display or the repeater.

In one or more embodiments, receiving the command that includes the configuration information associated with the video stream may include receiving the command from the information handling system or another repeater. In one or more embodiments, receiving the video frame may include receiving the video frame the information handling system or another repeater. For example, the other repeater may interpose the information handling system and the first display. In one or more embodiments, determining if the video frame is the synchronization frame may include determining if the video frame includes at least one pattern. In one example, the at least one pattern may include multiple colors. In another example, the command may include the at least one pattern. In one or more embodiments, determining if the video frame is to be displayed may include determining if a frame count associated with the video frame matches a parity associated with the command.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
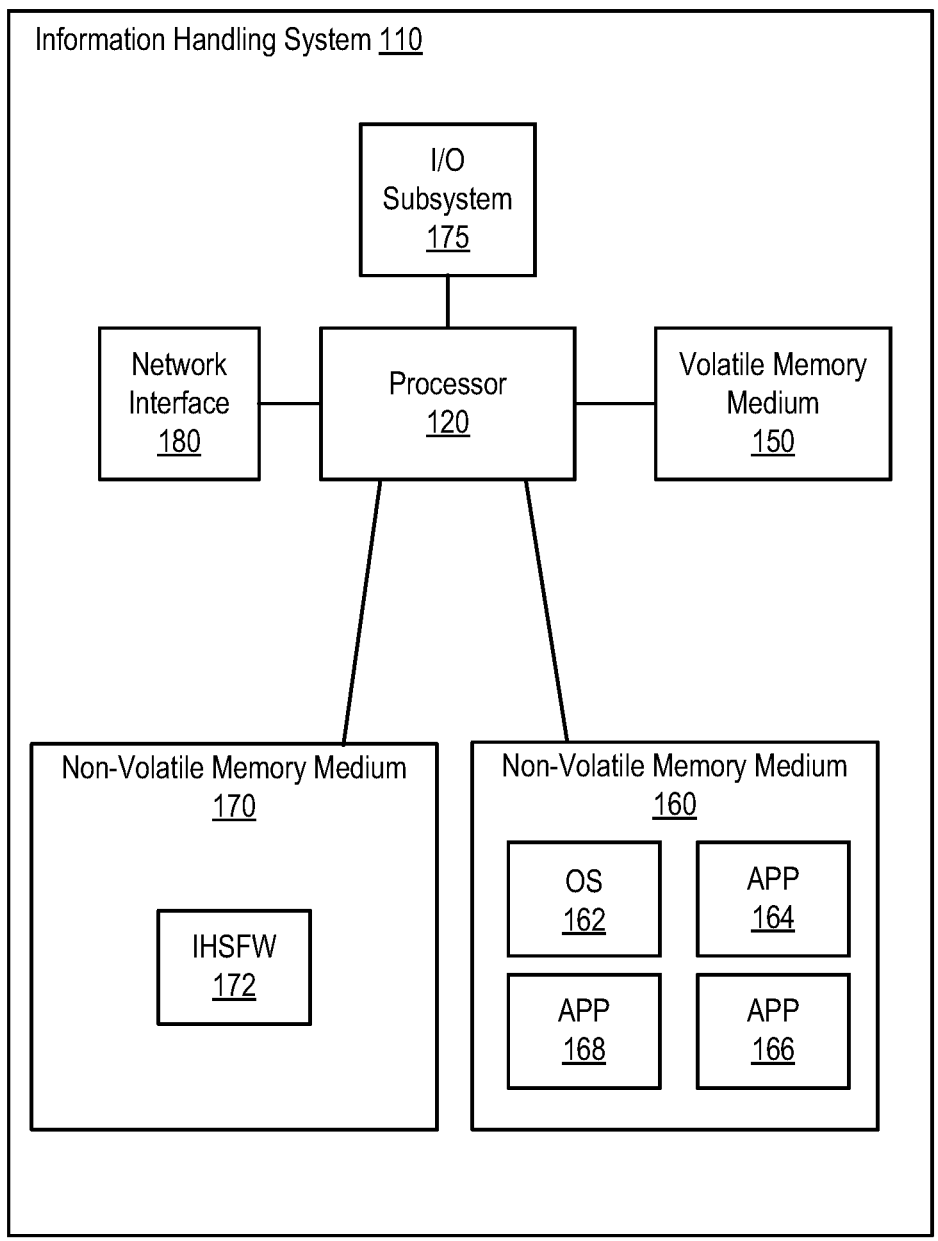
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, distributing video content to displays may be accomplished via storage and replacement of the video content or may accomplished be via networking downloads of the content. For example, a display may be equipped with a processor system that may handle signal decoding and video rendering. For instance, this may increase resource utilization of the display.

In one or more embodiments, a content source device may be coupled to multiple displays. For example, the multiple displays may be coupled via a daisy chain topology. For instance, the content source may be coupled to a first display, the first display may be coupled to a second display, the second display may be coupled to a third display, etc., and content for the third display may be distributed by the content source to the third display via the first display and the second display. In one or more embodiments, the video interface may include one or more of DisplayPort, HDMI (High-Definition Multimedia Interface), and DVI (Digital Visual Interface), among others. For example, a last display may be considered a sink device, and one or more displays between the sink device and the content source may be considered branch devices. For instance, each branch device may include a video input port and a video output port.

In one or more embodiments, one or more displays between the content source and sink device may receive a video stream via respective one or more input ports and relay the video stream via respective one or more output ports. For example, one or more branch devices may relay the video stream. In one or more embodiments, a repeater may be utilized. For example, a distance between the content source and a display or a distance between two displays may be greater than a specification recommends or requires. For instance, a repeater may be utilized between the content source and a display and/or between two displays.

In one or more embodiments, a video stream may include multiple portions. For example, each of the multiple portions of the video stream may be displayed by a respective display of multiple video displays. For instance, a synchronization frame may precede each portion of the video stream, which may indicate to a respective display to display a number of frames that are subsequent to the synchronization frame. In one or more embodiments, a synchronization frame may a start of a new video frame sequence. For example, the new video frame sequence may include content to be displayed via one or more displays. For instance, the content to be displayed may include different portions to be displayed by respective different displays.

In one or more embodiments, a synchronization frame may include a pattern. In one example, a first display may determine that a video stream includes a first pattern, and the first display may display a first number of frames that follow a synchronization frame that includes the first pattern. In another example, a second display may determine that the video stream includes a second pattern, and the second display may display a second number of frames that follow a synchronization frame that includes the first second. In one or more embodiments, a video processor (e.g., a scalar) may determine if a synchronization frame includes a specific pattern. For example, the video processor may determine if the synchronization frame includes the specific pattern via determining if the synchronization frame includes specific pixel values in one or more portions of the synchronization frame. For instance, the video processor may determine if the synchronization frame includes the specific pattern via determining if the synchronization frame includes specific pixel values in each of four corners of the synchronization frame. In one or more embodiments, determining if a frame is a synchronization frame may include determining that a frame includes the specific pattern. For example, if a frame is determined to be a synchronization frame, a frame count may be reset.

In one or more embodiments, an allocation of frames may be static or dynamic. In one example, frames may be assigned to a display may be pre-defined and/or known to the display. In one instance, a video processor may utilize frames of a video stream at designated frame counts. In another instance, a video processor may utilize a first frame of every five frames of a video stream. In another example, different video content may utilize different frame rates. For instance, a first display may utilize a first two frames of every five frames of a video stream for a period of time, and a second display may utilize a third frame of every five frames of the video stream for the period of time.

In one or more embodiments, one or more commands may be provided to one or more displays. In one example, a command format may include a regular frame update. For instance, the regular frame update may include a number of frames per cycle and a starting frame count (e.g., R(5,2) may indicate to display every second frame in a five-frame cycle). In a second example, a command format may include an on-demand update. For instance, the on-demand update may include a starting frame count and a number of frames that may follow (e.g., D(10, 2) may indicate to display two frames that follow frame ten). In another example, a command format may include a broadcast update. For instance, the broadcast update may indicate that all frames are to be displayed.

In one or more embodiments, one or more commands may be provided via an out-of-band method, process, and/or system. For example, one or more commands may be provided via one or more of a DisplayPort AUX channel, a monitor control command set, a display data channel, an Ethernet, and an inter-integrated circuit bus, among others. In one instance, DisplayPort AUX channel or a display data channel/command interface may be utilized to transport a frame assignment command. In another instance, a monitor control command set may be utilized as a command protocol to pack multiple commands.

In one or more embodiments, multiple displays may share an amount of bandwidth for video content. For example, the amount of bandwidth for the video content may include a frame rate of a resolution. For instance, DisplayPort version 1.4 may accommodate one hundred and twenty frames per second with 3840×2160 resolution. In one instance, each of the multiple displays may equally share a frame rate. In another instance, a first display of the multiple displays may utilize a first frame rate and a second display of the multiple displays may utilize a second frame rate, where the first frame rate may be less than the second frame rate. In this example, adding each frame rate of the multiple displays may equal one hundred and twenty frames per second.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
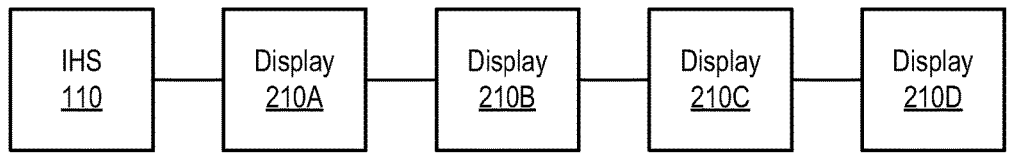
FIG. 2A illustrates an example of an information handling system and multiple displays, according to one or more embodiments.

Turning now to FIG. 2A, an example of an information handling system and multiple displays is illustrated, according to one or more embodiments. As shown, IHS 110 may be coupled to a display 210A. In one or more embodiments, IHS 110 may be or include a content source device. For example, IHS 110 may provide a video stream to display 210A. For instance, the video stream may include multiple frames.

As illustrated, display 210A may be coupled to a display 210B, which may be coupled to a display 210C. As shown, display 210C may be coupled to a display 210D. In one or more embodiments, display 210A may receive the video stream from IHS 110 and may provide the video stream to display 210B. For example, display 210A may display one or more portions of the video stream. In one or more embodiments, display 210B may receive the video stream from display 210A and may provide the video stream to display 210C. For example, display 210B may display one or more portions of the video stream. In one or more embodiments, display 210C may receive the video stream from display 210B and may provide the video stream to display 210D. For example, display 210C may display one or more portions of the video stream. In one or more embodiments, display 210D may receive the video stream from display 210C. For example, display 210D may display one or more portions of the video stream.

Figure 2B:
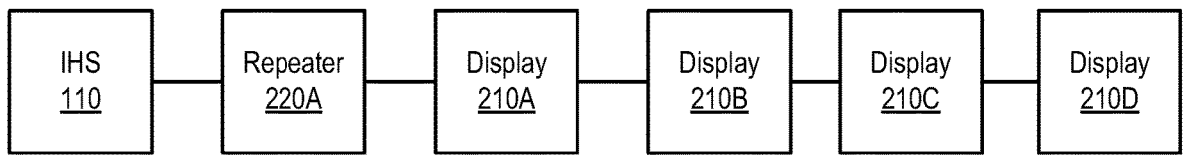
FIGS. 2B and 2C illustrate examples of an information handling system, a repeater, and multiple displays, according to one or more embodiments.
Figure 2C:
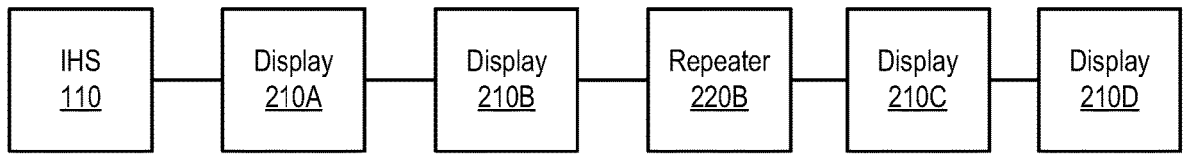

Turning now to FIGS. 2B and 2C, examples of an information handling system, a repeater, and multiple displays are illustrated, according to one or more embodiments. As shown in FIG. 2B, IHS 110 may be coupled to a repeater 220A, which may be coupled to display 210A. In one or more embodiments, a distance between IHS 110 and display 210A may be greater than a specification recommends or requires. For example, IHS 110 may provide a video stream to repeater 220A, and repeater 220A may provide the video stream to display 210A. As illustrated in FIG. 2C, display 210B may be coupled to a repeater 220B, which may be coupled to display 210C. In one or more embodiments, a distance between display 210B and display 210C may be greater than a specification recommends or requires. For example, display 210B may provide a video stream to repeater 220B, and repeater 220B may provide the video stream to display 210C. In one or more embodiments, any number of repeaters and/or any number of displays may be utilized in various configurations.

Figure 2D:
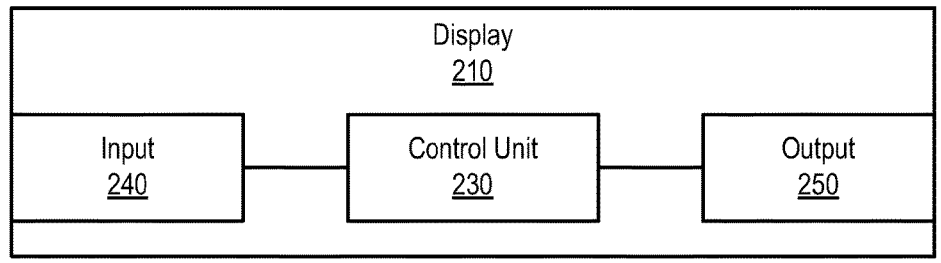
FIG. 2D illustrates an example block diagram of a display, according to one or more embodiments.

Turning now to FIG. 2D, an example block diagram of a display is illustrated, according to one or more embodiments. As shown, display 210 may include a control unit 230. In one or more embodiments, control unit 230 may be configured to implement one or more systems, flowcharts, methods, and/or processes described herein. In one or more embodiments, control unit 230 may be or include a scalar and/or a video processor. As illustrated, display 210 may include an input 240 coupled to control unit 230 and may include an output 250 coupled to control unit 230. In one example, input 240 may include a HDMI interface, a DVI interface, or a DisplayPort interface, among others. In another example, output 250 may include a HDMI interface, a DVI interface, or a DisplayPort interface, among others. In one or more embodiments, display 210 may receive a video stream from IHS 110, a repeater 220, or another display 210 via input 240. In one or more embodiments, control unit 230 may receive the video stream from input 240. In one or more embodiments, control unit 230 may process video stream. For example, processing the video stream may include displaying one or more frames and/or one or more portions of the video stream. In one or more embodiments, control unit 230 may provide the video stream to output 250. For example, output 250 may provide the video stream to a repeater 220 or another display 210. In one or more embodiments, output 250 may not output the video stream to a repeater 220 or another display 210. For example display 210D may not output the video stream to a repeater 220 or another display 210. In one or more embodiments, display 210 may include one or more screens (not specifically illustrated) that may provide light emissions, based at least on one or more frames of the video stream, to one or more persons and/or one or more cameras.

Figure 3A:
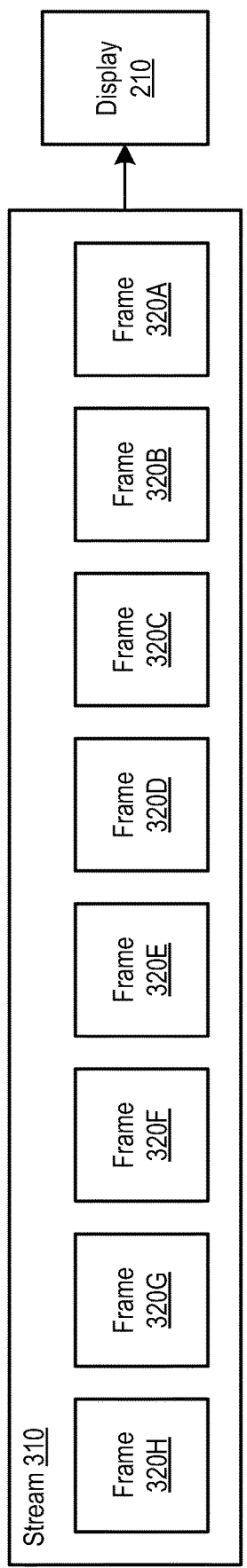
FIG. 3A illustrates an example of a video stream, according to one or more embodiments.

Turning now to FIG. 3A, an example of a video stream is illustrated, according to one or more embodiments. As shown, a video stream 310 may include multiple frames, such as frames 320A-320H. As illustrated, display 210 may receive video stream 310. In one or more embodiments, a frame 320 may be a synchronization frame or a content frame.

Figure 3C:
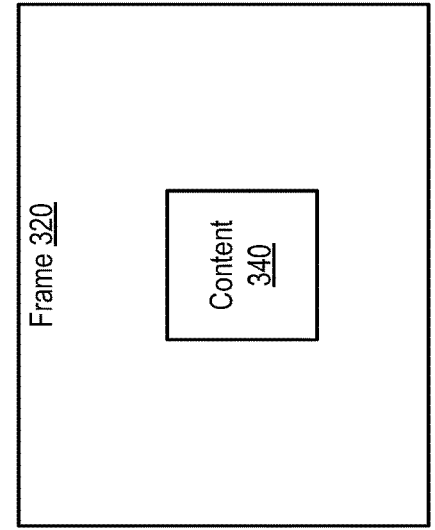
FIG. 3C illustrates an example of a content frame, according to one or more embodiments.
Figure 3B:
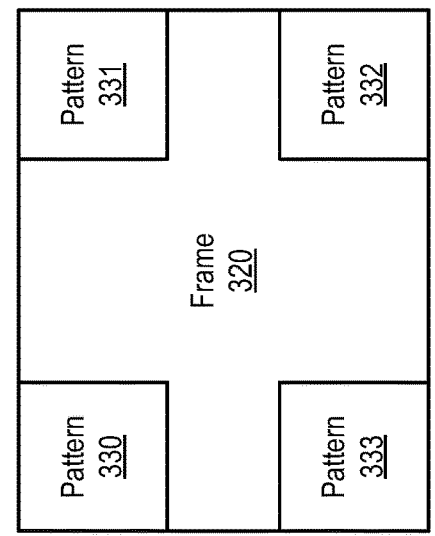
FIG. 3B illustrates an example of a synchronization frame, according to one or more embodiments.

Turning now to FIG. 3B, an example of a synchronization frame is illustrated, according to one or more embodiments. As shown, a synchronization frame 320 may include multiple patterns, such as patterns 330-333. In one or more embodiments, a pattern may include one or more pixels. In one example, pattern 330 may include one or more red pixels, pattern 331 may include one or more green pixels, pattern 332 may include one or more blue pixels, and pattern 333 may include one or more black pixels. In another example, pattern 330 may include one or more black pixels, pattern 331 may include one or more red pixels, pattern 332 may include one or more green pixels, and pattern 333 may include one or more blue pixels. In one or more embodiments, a pattern may include multiple colors. For example, the pattern may include multiple pixels associated with multiple colors.

In one or more embodiments, display 210 may receive one or more commands that includes a synchronization pattern and configures display 210. For example, display 210 may receive the one or more commands that includes the synchronization pattern and configures display 210 via one or more of a DisplayPort AUX channel, a monitor control command set, a display data channel, an Ethernet, and an I²C bus, among others. For instance, the one or more commands may include a marker and/or a data sequence that may be utilized by display 210 to correlate and/or associate a video frame as a synchronization frame, which was configured outside a video stream.

Turning now to FIG. 3C, an example of a content frame is illustrated, according to one or more embodiments. As shown, a content frame 320 may include content 340. For example, content 340 may include an image. In one or more embodiments, display 210 may display content 340. For example, display 210 may display content 340 via its screen(s).

Figure 4:
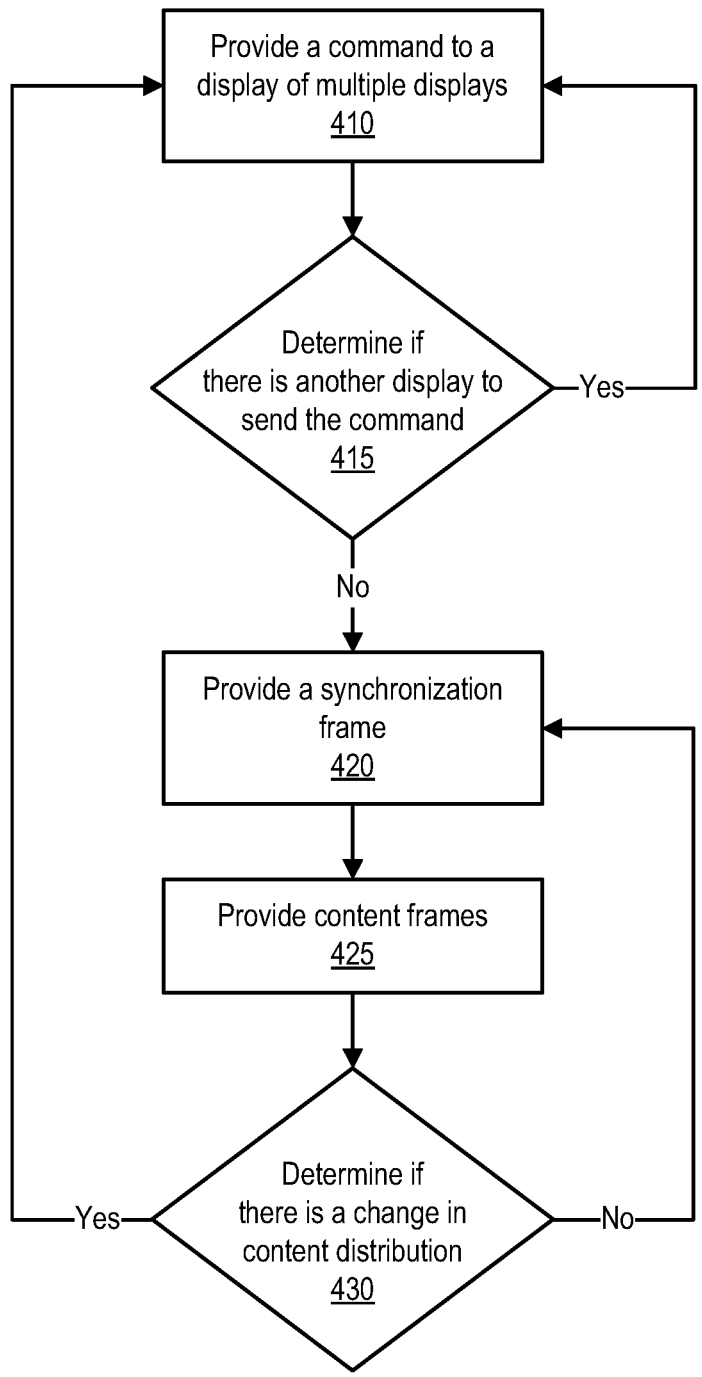
FIG. 4 illustrates an example method of operating an information handling system, according to one or more embodiments.

Turning now to FIG. 4, an example method of operating an information handling system is illustrated, according to one or more embodiments. At 410, a command may be provided to a display of multiple displays. For example IHS 110 may provide a command to a display of multiple displays. In one or more embodiments, the command may include an address. For example, the command may include an address associated with a display of displays 210A-210D. In one instance, IHS 110 may provide a command, addressed to display 210A, to display 210A. In another instance, IHS 110 may provide a command, addressed to display 210C, to display 210A, and one or more displays and/or one or more repeaters may repeat and/or relay the command to display 210C. In one or more embodiments, the command may include one or more patterns associated with a synchronization frame. For example, the command may include one or more of patterns 330-333.

In one or more embodiments, a command format may include an update. In one example, a command format may include a regular frame update. For instance, the regular frame update may include a number of frames per cycle and a starting frame count (e.g., R(5,2) may indicate to display every second frame in a five-frame cycle). In a second example, a command format may include an on-demand update. For instance, the on-demand update may include a starting frame count and a number of frames that may follow (e.g., D(10, 2) may indicate to display two frames that follow frame ten). In another example, a command format may include a broadcast update. For instance, the broadcast update may indicate that all frames are to be displayed.

In one or more embodiments, one or more commands may be provided via an out-of-band method, process, and/or system. For example, one or more commands may be provided via one or more of a DisplayPort AUX channel, a monitor control command set, a display data channel, an Ethernet, and an inter-integrated circuit bus, among others. In one instance, DisplayPort AUX channel or a display data channel/command interface may be utilized to transport a frame assignment command. In another instance, a monitor control command set may be utilized as a command protocol to pack multiple commands.

At 415, it may be determined if there is another display to send the command. For example, IHS 110 may determine if there is another display to send the command. If there is another display to send the command, the method may proceed to 410, according to one or more embodiments. If there is not another display to send the command, a synchronization frame may be provided, at 420. In one example, IHS 110 may provide a synchronization frame to display 210A. In another example, IHS 110 may provide a synchronization frame to repeater 220A.

At 425, content frames may be provided. In one example, IHS 110 may provide content frames to display 210. In another example, IHS 110 may provide content frames to repeater 20A. At 430, it may be determined if there is a change in content distribution. For example, IHS 110 may determine if there is a change in content distribution. In one or more embodiments, a change in content distribution may include a number of frames per second allocation to one or more displays and/or a static frame allocation to one or more frames, among others. If there is not a change in content distribution, the method may proceed to 420, according to one or more embodiments. If there is a change in content distribution, the method may proceed to 410, according to one or more embodiments.

Figure 5:
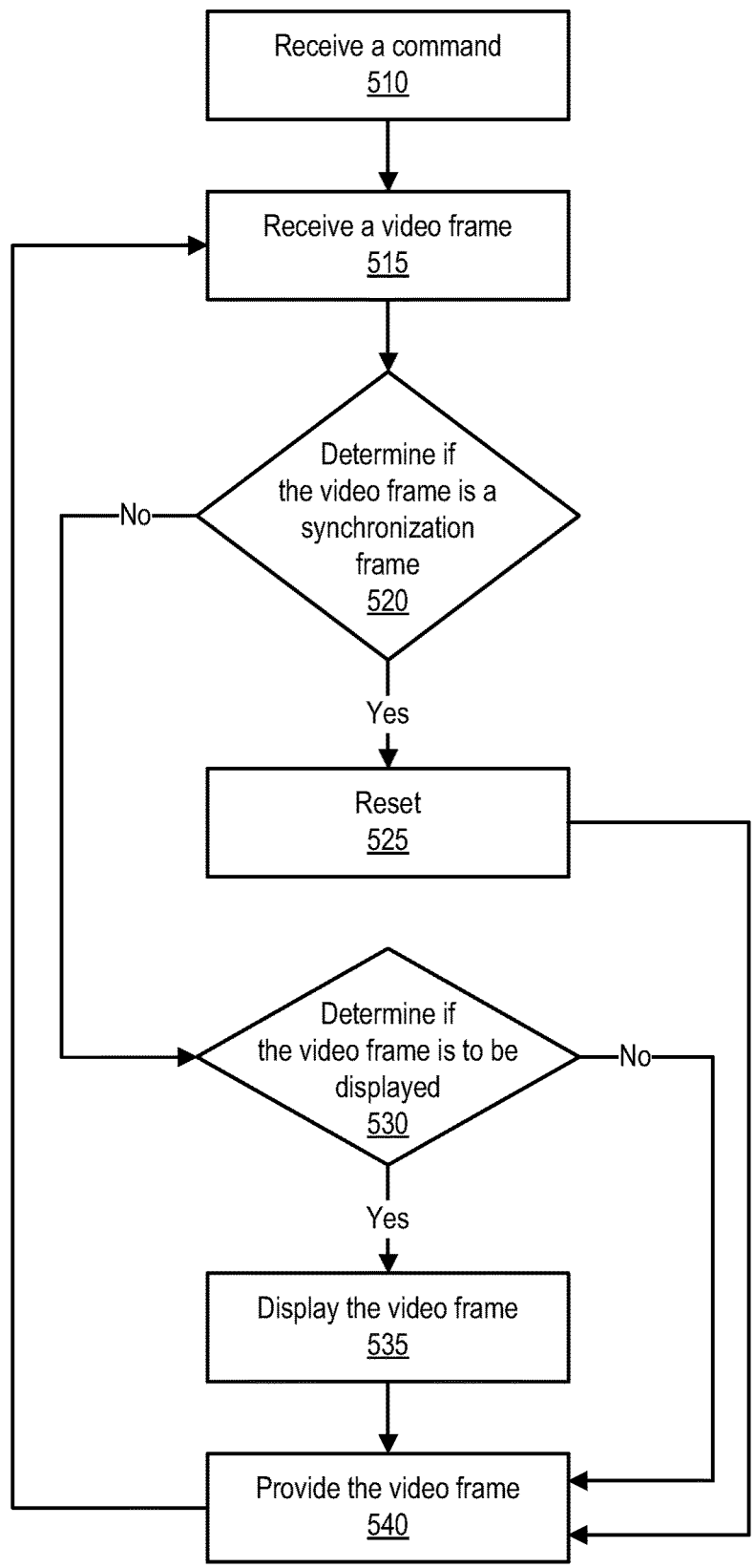
FIG. 5 illustrates an example method of operating a display, according to one or more embodiments.

Turning now to FIG. 5, an example method of operating a display is illustrated, according to one or more embodiments. At 510, a command may be received. For example, display 210 may receive a command. In one instance, display 210 may receive the command from IHS 110. In a second instance, display 210 may receive the command from another display 210. In one instance, display 210 may receive the command from repeater 220. In one or more embodiments, display 210 may receive the command via one or more of a DisplayPort AUX channel, a monitor control command set, a display data channel, an Ethernet, and an inter-integrated circuit bus, among others.

At 515, a video frame may be received. For example, display 210 may receive a video frame. In one instance, display 210 may receive the video frame from IHS 110. In a second instance, display 210 may receive the video frame from another display 210. In another instance, display 210 may receive the video frame from repeater 220. At 520, it may be determined if the video frame is a synchronization frame. For example, display 210 may determine if the video frame is a synchronization frame. In one or more embodiments, determining if the video frame is a synchronization frame may include determining if the video frame includes one or more patterns. For example, determining if the video frame is a synchronization frame may include determining if the video frame includes one or more patterns 330-333.

If the video frame is a synchronization frame, a reset may be performed, at 525. For example, display 210 may perform the reset. In one or more embodiments, performing the reset may include resetting one or more counters of display 210.

For example, a frame count may be reset. In one or more embodiments, the method may proceed to 540.

If the video frame is not a synchronization frame, it may be determined if the video frame is to be displayed, at 530. For example, display 210 may determine if the video frame is to be displayed. In one or more embodiments, determining if the video frame is to be displayed may include utilizing one or more counters. For example, the one or more counters may include a frame count. In one or more embodiments, determining if the video frame is to be displayed may include determining if a current frame count matches a parity associated with the command. For example, the parity associated with the command may include every Nth frame. In one instance, the parity associated with the command may be five, and display 210 may display every fifth frame and may not display other video frames.

If the video frame is to be displayed, the content frame may be displayed at 535. For example, display 210 may display the content frame. For instance, display 210 may display the content frame its screen(s). If the content frame is not to be displayed, the contented frame may be provided. In one example, display 210 may provide the content frame to another display 210. In another example, display 210 may provide the content frame to repeater 220. In one or more embodiments, the method may proceed to 515. In one or more embodiments, another command may be received, and the method may proceed to 510. For example, method element 510 may be performed at any time, and the method may proceed to 515 after the method completes method element 540.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display, comprising:
 a control unit;
 wherein the control unit is configured to:
  receive a command that includes configuration information associated with a video stream;
  receive a video frame;
  determine that the video frame is a synchronization frame, including determining that the video frame includes at least one pattern including a plurality of colors;
  in response to determining that the video frame is the synchronization frame:
   reset one or more counters; and
   provide the video frame to another display or a repeater;
  determining that the video frame is not the synchronization frame and in response determine that the video frame is to be displayed;
  in response to determining that the video frame is to be displayed:
   display the video frame; and
   provide the video frame to the other display or the repeater; and
  determining that the video frame is not the synchronization frame, and in response determining that the video frame is not to be displayed;
  in response to determining that the video frame is not to be displayed, provide the video frame to the other display or the repeater.

2. The display of claim 1, wherein, to receive the command that includes the configuration information associated with the video stream, the control unit is further configured to receive the command from an information handling system or another repeater.

3. The display of claim 1, wherein, to receive the video frame, the control unit is further configured to receive the video frame from an information handling system or another repeater.

4. The display of claim 1, wherein the command include the at least one pattern.

5. The display of claim 1, wherein, determining that the video frame is to be displayed, the control unit is further configured to determine that a frame count associated with the video frame matches a parity associated with the command.

6. A method, comprising:
 a display receiving a command that includes configuration information associated with a video stream;
 the display receiving a video frame;
 the display determining that the video frame is a synchronization frame, including determining that the video frame includes at least one pattern including a plurality of colors;
 in response to determining that the video frame is the synchronization frame:
  the display resetting one or more counters; and
  the display providing the video frame to another display or a repeater;
 the display determining that the video frame is not the synchronization frame, and in response, the display determining that the video frame is to be displayed;
 in response to the display determining that the video frame is to be displayed:
  the display displaying the video frame; and
  the display providing the video frame to the other display or the repeater; and
 the display determining that the video frame is not the synchronization frame, and in response, the display determining that the video frame is not to be displayed; and
 in response to determining that video frame is not be displayed, the display providing the video frame to the other display or the repeater.

7. The method of claim 6, wherein the display receiving the command that includes configuration information associated with the video stream includes the display receiving the command from an information handling system or another repeater.

8. The method of claim 6, wherein the display receiving the video frame includes the display receiving the video frame from an information handling system or another repeater.

9. The display of claim 6, wherein the command include the at least one pattern.

10. The method of claim 6, wherein the display determining that the video frame is to be displayed includes determining that a frame count associated with the video frame matches a parity associated with the command.

11. A system, comprising:
an information handling system; and
a plurality of displays coupled to the information handling system;
wherein a first display of the plurality is coupled to the information handling system;
wherein the information handling system includes:
at least one processor; and
a memory medium, coupled to the processor;
wherein the memory medium includes processor instructions, which when executed by the at least one processor, cause the information handling system to:
provide a command, that includes configuration information associated with a video stream, to each of the plurality of displays; and
provide a plurality of video frames to the first display; and
wherein the first display is configured to:
receive the command;
receive a video frame of the plurality of video frames;
determine that the video frame is a synchronization frame, including determining that the video frame includes at least one pattern including a plurality of colors;
in response to determining that the video frame is the synchronization frame;
reset one or more counters; and
provide the video frame to a second display of the plurality of displays or a repeater;
determining that the video frame is not the synchronization frame, and in response, determine that the video frame is to be displayed;
in response to determining that the video is not the synchronization frame, and in response, determining that the video frame is to be displayed:
display the video frame; and
provide the video frame to the second display or the repeater; and
determining that the video frame is not the synchronization frame, and in response, determining that the video frame is not to be displayed;
in response to determining that the video frame is not to be displayed, provide the video frame to the second display or the repeater.

12. The system of claim 11, wherein, to receive the command, the first display is further configured to receive the command from the information handling system or another repeater.

13. The system of claim 11, wherein, to receive the video frame, the first display is further configured to receive the video frame from the information handling system or another repeater.

14. The display of claim 11, wherein the command include the at least one pattern.

* * * * *